(12) United States Patent
Takatsuka et al.

(10) Patent No.: US 10,650,444 B2
(45) Date of Patent: May 12, 2020

(54) BATTERY RESERVATION DEVICE AND BATTERY RESERVATION METHOD

(71) Applicant: OMRON CORPORATION, Kyoto-shi, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto-shi (JP)

( * ) Notice: Subject to any disclaimer, the term of this patent is extended or adjusted under 35 U.S.C. 154(b) by 21 days.

(21) Appl. No.: 15/759,221

(22) PCT Filed: Nov. 2, 2016

(86) PCT No.: PCT/JP2016/082677
§ 371 (c)(1),
(2) Date: Mar. 11, 2018

(87) PCT Pub. No.: WO2017/086174
PCT Pub. Date: May 26, 2017

(65) Prior Publication Data
US 2018/0253788 A1  Sep. 6, 2018

(30) Foreign Application Priority Data
Nov. 17, 2015  (JP) .................. 2015-224344

(51) Int. Cl.
*G05B 19/418* (2006.01)
*G06Q 30/06* (2012.01)
(Continued)

(52) U.S. Cl.
CPC .......... *G06Q 30/0645* (2013.01); *B60K 6/28* (2013.01); *B60L 50/50* (2019.02); *B60L 53/65* (2019.02);
(Continued)

(58) Field of Classification Search
CPC ... Y02T 10/7005; Y02T 90/16; Y02T 90/124; Y02T 90/128; Y02T 90/163; Y02T 10/7088; Y02T 90/168
See application file for complete search history.

(56) References Cited

U.S. PATENT DOCUMENTS

RE30,939 E  *  5/1982  d'Alayer de Costemore
 d'Arc ..................... G11B 15/43
 242/334.4
4,411,008 A  * 10/1983  d'Alayer de Costemore
 d'Arc ..................... G01B 7/042
 360/137
(Continued)

FOREIGN PATENT DOCUMENTS

CN  1293149 A  5/2001
CN  103522994 A  1/2014
(Continued)

OTHER PUBLICATIONS

The Taiwanese Office Action (TWOA) dated Feb. 21, 2018 in a related Taiwanese patent application.
(Continued)

*Primary Examiner* — Darrin D Dunn
(74) *Attorney, Agent, or Firm* — Metrolex IP Law Group, PLLC

(57) ABSTRACT

A battery reservation device (10) comprises a battery state acquisition component (12), a scheduled return time acquisition component (13*c*), a remaining battery charge prediction component (14), a battery station information acquisition component (15), and a reservation acceptance component (17). The battery state acquisition component (12) acquires the remaining battery charge of a battery pack (1) scheduled to be returned to a battery station (30*a*). The scheduled return time acquisition component (13*c*) acquires the scheduled return time of the battery pack (1). The
(Continued)

remaining battery charge prediction component (14) predicts the remaining battery charge at the time of return on the basis of the current remaining battery charge of the battery pack (1) and the scheduled return time. The battery station information acquisition component (15) acquires the charging speed of a charger (31). The reservation acceptance component (17) accepts a rental reservation for the battery pack (1) scheduled to be returned on the basis of the remaining battery charge at the time of return and the charging speed of the charger (31).

10 Claims, 7 Drawing Sheets

(51) Int. Cl.
  *B60L 58/12*     (2019.01)
  *H01M 10/48*     (2006.01)
  *H01M 10/44*     (2006.01)
  *G06Q 10/08*     (2012.01)
  *G06Q 50/06*     (2012.01)
  *B60K 6/28*      (2007.10)
  *B60L 53/65*     (2019.01)
  *G06Q 10/02*     (2012.01)
  *B60L 50/50*     (2019.01)
  *B60L 53/80*     (2019.01)
  *H02J 7/00*      (2006.01)
  *H01M 10/42*     (2006.01)

(52) U.S. Cl.
  CPC .............. *B60L 53/80* (2019.02); *B60L 58/12* (2019.02); *G06Q 10/02* (2013.01); *G06Q 10/087* (2013.01); *G06Q 30/06* (2013.01); *G06Q 50/06* (2013.01); *H01M 10/425* (2013.01); *H01M 10/44* (2013.01); *H01M 10/441* (2013.01); *H01M 10/48* (2013.01); *H02J 7/00* (2013.01); *B60L 2200/12* (2013.01); *B60L 2240/54* (2013.01); *H01M 2010/4271* (2013.01); *H01M 2220/20* (2013.01)

(56) References Cited

U.S. PATENT DOCUMENTS

| | | | |
|---|---|---|---|
| 4,983,903 A * | 1/1991 | Bae .................... | B60K 1/04 320/128 |
| 5,048,353 A * | 9/1991 | Justus .................. | D21F 7/06 73/862.55 |
| 5,545,967 A * | 8/1996 | Osborne ................ | B60S 5/06 320/109 |
| 5,563,809 A * | 10/1996 | Williams ............... | G01N 9/24 700/122 |
| 5,612,606 A * | 3/1997 | Guimarin ............... | B60K 1/04 320/109 |
| 5,623,194 A | 4/1997 | Boll et al. | |
| 5,711,648 A * | 1/1998 | Hammerslag ........... | B60K 1/04 414/800 |
| 6,036,137 A * | 3/2000 | Myren .................. | B65H 18/10 242/534 |
| 6,325,321 B1 * | 12/2001 | Maurer ................. | B65H 18/20 242/414.1 |
| 6,363,434 B1 | 3/2002 | Eytchison | |
| 6,498,454 B1 * | 12/2002 | Pinlam ................. | H01M 10/44 320/107 |
| 6,498,457 B1 * | 12/2002 | Tsuboi ................. | B60L 50/64 320/110 |
| 7,002,265 B2 * | 2/2006 | Potega ................. | G01R 31/36 307/149 |
| 7,412,538 B1 | 8/2008 | Eytchison et al. | |
| 8,484,060 B2 | 7/2013 | D'Andrea et al. | |
| 8,634,879 B2 * | 1/2014 | Shi .................... | H04W 52/0248 455/572 |
| 8,698,642 B2 | 4/2014 | Taguchi | |
| 8,751,077 B2 | 6/2014 | Hiruta et al. | |
| 8,825,248 B2 | 9/2014 | Maki et al. | |
| 8,838,318 B2 * | 9/2014 | Segawa ................ | G01C 21/34 701/22 |
| 8,862,391 B2 * | 10/2014 | Park ................... | B60L 3/12 701/437 |
| 8,941,463 B2 * | 1/2015 | Rovik .................. | B60L 3/12 340/5.2 |
| 8,952,656 B2 | 2/2015 | Tse | |
| 8,963,495 B2 * | 2/2015 | Park ................... | B60S 5/06 29/730 |
| 8,970,341 B2 * | 3/2015 | Park ................... | B60L 3/12 340/4.3 |
| 9,123,035 B2 * | 9/2015 | Penilla ................ | G06Q 20/18 |
| 9,129,272 B2 * | 9/2015 | Penilla ................ | G06Q 20/18 |
| 9,156,360 B2 * | 10/2015 | Park ................... | B60L 50/66 |
| 9,170,118 B2 * | 10/2015 | Kiyama ............... | G01C 21/3469 |
| 9,172,254 B2 | 10/2015 | Ganor | |
| 9,177,305 B2 * | 11/2015 | Penilla ................ | G06Q 20/18 |
| 9,177,306 B2 * | 11/2015 | Penilla ................ | G06Q 20/18 |
| 9,193,277 B1 * | 11/2015 | Penilla ................ | G06Q 20/18 |
| 9,248,752 B2 | 2/2016 | Kuribayashi et al. | |
| 9,302,592 B2 * | 4/2016 | Lin ..................... | B60L 53/305 |
| 9,321,357 B2 * | 4/2016 | Caldeira ............. | B60L 11/1801 |
| 9,371,007 B1 | 6/2016 | Penilla et al. | |
| 9,440,544 B2 * | 9/2016 | Lewis ................. | B60L 11/1822 |
| 9,442,548 B1 * | 9/2016 | Johansson ............ | G06F 1/3212 |
| 9,488,493 B2 | 11/2016 | MacNeille et al. | |
| 9,496,736 B1 * | 11/2016 | Johansson ............ | H02J 7/0054 |
| 9,597,973 B2 * | 3/2017 | Penilla ................ | G06Q 20/18 |
| 9,623,762 B2 | 4/2017 | Park | |
| 9,738,168 B2 * | 8/2017 | Penilla ................ | G06Q 20/18 |
| 9,925,882 B2 * | 3/2018 | Penilla ................ | G06Q 20/18 |
| 9,987,938 B2 * | 6/2018 | Salasoo ............... | B60L 11/1822 |
| 10,084,329 B2 * | 9/2018 | Hamilton ............. | H02J 7/0045 |
| 10,086,714 B2 * | 10/2018 | Penilla ................ | G06Q 20/18 |
| 10,116,151 B2 * | 10/2018 | Seng .................. | H02J 7/0042 |
| 10,209,090 B2 * | 2/2019 | Luke .................. | B60L 1/003 |
| 10,245,964 B2 * | 4/2019 | Penilla ................ | G06Q 20/18 |
| 10,286,801 B2 | 5/2019 | Shimizu et al. | |
| 2003/0069868 A1 * | 4/2003 | Vos .................... | G06Q 10/10 706/45 |
| 2003/0074134 A1 * | 4/2003 | Shike .................. | G08G 1/20 701/34.4 |
| 2003/0085621 A1 * | 5/2003 | Potega ................. | G01R 31/36 307/18 |
| 2004/0113591 A1 | 6/2004 | Bradley et al. | |
| 2004/0158544 A1 * | 8/2004 | Taekman .............. | G06Q 10/00 706/45 |
| 2005/0035740 A1 * | 2/2005 | Elder .................. | B60L 3/0046 320/116 |
| 2005/0035741 A1 * | 2/2005 | Elder .................. | B60L 3/0046 320/116 |
| 2006/0181427 A1 * | 8/2006 | Bouse .................. | G05B 19/4065 340/657 |
| 2007/0043665 A1 * | 2/2007 | Jemella ................ | G06Q 20/10 705/40 |
| 2007/0176040 A1 * | 8/2007 | Asikainen ............ | B65H 26/02 242/534 |
| 2008/0157722 A1 * | 7/2008 | Nobutaka ............. | H01M 10/44 320/137 |
| 2008/0215180 A1 | 9/2008 | Kota | |
| 2009/0082957 A1 | 3/2009 | Agassi et al. | |
| 2009/0088889 A1 * | 4/2009 | Hellstrom ............. | B65H 26/02 700/127 |
| 2009/0243549 A1 | 10/2009 | Matsumura et al. | |
| 2009/0315359 A1 | 12/2009 | Suzuki et al. | |
| 2010/0071979 A1 * | 3/2010 | Heichal ............... | B60K 1/04 180/68.5 |
| 2010/0100573 A1 | 4/2010 | Harel et al. | |
| 2010/0105449 A1 * | 4/2010 | Shi .................... | H04W 52/0248 455/574 |
| 2010/0106401 A1 | 4/2010 | Naito et al. | |

(56) References Cited

U.S. PATENT DOCUMENTS

| | | | |
|---|---|---|---|
| 2010/0164439 A1 | 7/2010 | Ido | |
| 2010/0230188 A1* | 9/2010 | Nguyen | B60S 5/06 180/65.1 |
| 2010/0289451 A1 | 11/2010 | Tuffner et al. | |
| 2011/0032110 A1 | 2/2011 | Taguchi | |
| 2011/0128007 A1 | 6/2011 | Nishidai et al. | |
| 2011/0156662 A1* | 6/2011 | Nakamura | B60S 5/06 320/162 |
| 2011/0225105 A1* | 9/2011 | Scholer | G06Q 50/06 705/412 |
| 2011/0257901 A1* | 10/2011 | Bechhoefer | G01H 1/00 702/34 |
| 2011/0303509 A1* | 12/2011 | Agassi | B60K 1/04 198/604 |
| 2012/0054076 A1 | 3/2012 | Wu et al. | |
| 2012/0098676 A1 | 4/2012 | Oizumi et al. | |
| 2012/0109519 A1 | 5/2012 | Uyeki | |
| 2012/0112696 A1 | 5/2012 | Ikeda et al. | |
| 2012/0136594 A1* | 5/2012 | Tang | H01M 10/425 702/63 |
| 2012/0229089 A1* | 9/2012 | Bemmel | H02J 7/0013 320/109 |
| 2012/0242148 A1* | 9/2012 | Galati | H02J 3/14 307/39 |
| 2012/0271723 A1* | 10/2012 | Penilla | G06Q 20/18 705/16 |
| 2012/0306445 A1* | 12/2012 | Park | B60S 5/06 320/109 |
| 2012/0326655 A1 | 12/2012 | Nomura | |
| 2013/0013139 A1 | 1/2013 | Maki et al. | |
| 2013/0030581 A1* | 1/2013 | Luke | B60L 1/003 700/286 |
| 2013/0030608 A1* | 1/2013 | Taylor | B60L 1/003 701/2 |
| 2013/0046457 A1 | 2/2013 | Pettersson | |
| 2013/0049677 A1* | 2/2013 | Bouman | B60L 1/003 320/106 |
| 2013/0119920 A1 | 5/2013 | Hsu et al. | |
| 2013/0151293 A1* | 6/2013 | Karner | G06Q 20/102 705/5 |
| 2013/0192060 A1* | 8/2013 | Park | B60L 3/12 29/729 |
| 2013/0197803 A1* | 8/2013 | Park | B60L 3/12 701/537 |
| 2013/0226441 A1* | 8/2013 | Horita | G01C 21/3469 701/118 |
| 2013/0261953 A1 | 10/2013 | Kiyama et al. | |
| 2013/0282472 A1* | 10/2013 | Penilla | B60L 53/305 705/14.35 |
| 2013/0317790 A1 | 11/2013 | Fukubayashi | |
| 2013/0335025 A1 | 12/2013 | Kuribayashi et al. | |
| 2013/0342310 A1* | 12/2013 | Park | B60L 3/12 340/5.7 |
| 2013/0343842 A1* | 12/2013 | Yu | B65G 1/137 414/273 |
| 2013/0345976 A1 | 12/2013 | Li et al. | |
| 2014/0002019 A1 | 1/2014 | Park et al. | |
| 2014/0046595 A1* | 2/2014 | Segawa | G01C 21/34 701/541 |
| 2014/0100689 A1* | 4/2014 | Yu | B65G 1/137 700/218 |
| 2014/0116124 A1* | 5/2014 | Ma | G05B 23/0232 73/112.01 |
| 2014/0125281 A1 | 5/2014 | Mitsutani | |
| 2014/0148965 A1* | 5/2014 | Epstein | B60L 53/53 700/297 |
| 2014/0163877 A1* | 6/2014 | Kiyama | G01C 21/3469 701/533 |
| 2014/0172282 A1* | 6/2014 | Feng | B60L 58/12 701/117 |
| 2014/0232340 A1* | 8/2014 | Jones | G06Q 10/06 320/109 |
| 2014/0257884 A1* | 9/2014 | Kyoung | G06Q 10/02 705/5 |
| 2014/0266004 A1 | 9/2014 | Andrews, Jr. | |
| 2014/0371969 A1 | 12/2014 | Asai et al. | |
| 2015/0012212 A1* | 1/2015 | Park | B60L 3/12 701/431 |
| 2015/0024240 A1* | 1/2015 | Seubert | H02J 7/0065 429/50 |
| 2015/0039391 A1 | 2/2015 | Hershkovitz et al. | |
| 2015/0123611 A1* | 5/2015 | Huang | B60L 53/80 320/109 |
| 2015/0127479 A1* | 5/2015 | Penilla | G06Q 20/18 705/26.1 |
| 2015/0134142 A1* | 5/2015 | Taylor | G07C 5/00 701/1 |
| 2015/0134467 A1* | 5/2015 | Penilla | G06Q 20/18 705/16 |
| 2015/0134546 A1* | 5/2015 | Penilla | G06Q 20/18 705/305 |
| 2015/0149015 A1* | 5/2015 | Nakano | B60L 11/1861 701/22 |
| 2015/0158393 A1* | 6/2015 | Kawano | B60L 53/65 320/109 |
| 2015/0185721 A1 | 7/2015 | Deilmann et al. | |
| 2015/0202975 A1* | 7/2015 | Solomon | G06Q 10/06316 705/7.26 |
| 2015/0241233 A1 | 8/2015 | Loftus et al. | |
| 2015/0256003 A1* | 9/2015 | Yonetani | B60L 53/68 320/150 |
| 2015/0280465 A1* | 10/2015 | Lin | H02J 7/007 320/137 |
| 2015/0283912 A1 | 10/2015 | Shimizu et al. | |
| 2015/0286965 A1* | 10/2015 | Amano | G01C 21/3469 705/5 |
| 2015/0298565 A1 | 10/2015 | Iwamura et al. | |
| 2015/0298567 A1* | 10/2015 | Uyeki | B60L 11/1848 320/155 |
| 2015/0321570 A1 | 11/2015 | Cun | |
| 2015/0321571 A1* | 11/2015 | Penilla | G06Q 20/18 320/104 |
| 2015/0357837 A1* | 12/2015 | Takai | H01M 10/44 320/107 |
| 2015/0363749 A1* | 12/2015 | Buscher | G06Q 10/20 705/305 |
| 2015/0367743 A1* | 12/2015 | Lin | B60L 53/305 320/109 |
| 2015/0380936 A1* | 12/2015 | Frolik | H02J 3/14 307/112 |
| 2016/0009192 A1 | 1/2016 | Zhang et al. | |
| 2016/0016481 A1 | 1/2016 | Maya et al. | |
| 2016/0025506 A1* | 1/2016 | Penilla | G06Q 20/18 701/430 |
| 2016/0039296 A1 | 2/2016 | Nakamura et al. | |
| 2016/0039299 A1* | 2/2016 | Nguyen | B60L 11/1822 320/109 |
| 2016/0071079 A1* | 3/2016 | Aloe | H02J 7/0003 705/17 |
| 2016/0071138 A1 | 3/2016 | Hill | |
| 2016/0099590 A1* | 4/2016 | Velderman | H02J 7/0027 320/113 |
| 2016/0117759 A1* | 4/2016 | Penilla | B60L 53/305 705/26.9 |
| 2016/0159240 A1 | 6/2016 | Tseng et al. | |
| 2016/0176307 A1* | 6/2016 | Becker | B60L 11/1846 320/109 |
| 2016/0185246 A1 | 6/2016 | Paul | |
| 2016/0272078 A1 | 9/2016 | Kalyanaraman et al. | |
| 2016/0273927 A1 | 9/2016 | Kitajima et al. | |
| 2016/0303990 A1* | 10/2016 | Penilla | G06Q 20/18 |
| 2016/0343068 A1 | 11/2016 | Barrois et al. | |
| 2016/0364776 A1* | 12/2016 | Khoo | G06F 1/26 |
| 2016/0368464 A1* | 12/2016 | Hassounah | B60S 5/06 |
| 2016/0380440 A1* | 12/2016 | Coleman, Jr. | G05F 1/66 700/295 |
| 2017/0036560 A1 | 2/2017 | Schuelke et al. | |
| 2017/0043671 A1* | 2/2017 | Campbell | G01C 21/34 |
| 2017/0074677 A1 | 3/2017 | MacNeille et al. | |

(56) References Cited

U.S. PATENT DOCUMENTS

| | | | |
|---|---|---|---|
| 2017/0084155 A1 | 3/2017 | Mese et al. | |
| 2017/0085103 A1* | 3/2017 | Seng | H02J 7/0042 |
| 2017/0091890 A1 | 3/2017 | Hirose et al. | |
| 2017/0097652 A1* | 4/2017 | Luke | H02J 7/00 |
| 2017/0098176 A1 | 4/2017 | Hirose et al. | |
| 2017/0102695 A1* | 4/2017 | Hilemon | G05B 23/0264 |
| 2017/0136894 A1* | 5/2017 | Ricci | H02J 7/025 |
| 2017/0176195 A1 | 6/2017 | Rajagopalan et al. | |
| 2017/0190259 A1* | 7/2017 | Penilla | H02J 7/0021 |
| 2018/0012197 A1* | 1/2018 | Ricci | H04L 9/321 |
| 2018/0015835 A1* | 1/2018 | Penilla | G06Q 20/18 |
| 2018/0032920 A1* | 2/2018 | Ito | G06Q 10/04 |
| 2018/0041053 A1* | 2/2018 | Capizzo | H02J 7/0027 |
| 2018/0143029 A1 | 5/2018 | Nikulin et al. | |
| 2018/0154789 A1* | 6/2018 | Janku | B60S 5/06 |
| 2018/0202825 A1 | 7/2018 | You et al. | |
| 2018/0205257 A1 | 7/2018 | Kwon et al. | |
| 2018/0208069 A1* | 7/2018 | Lin | B60L 11/1822 |
| 2018/0241234 A1* | 8/2018 | Liang | H02J 7/0047 |
| 2018/0244167 A1* | 8/2018 | Penilla | G06Q 20/18 |
| 2018/0253788 A1* | 9/2018 | Takatsuka | B60L 58/12 |
| 2018/0253789 A1* | 9/2018 | Takatsuka | B60S 5/06 |
| 2018/0253928 A1* | 9/2018 | Assadsangabi | G06Q 20/18 |
| 2018/0272878 A1 | 9/2018 | Lee | |
| 2018/0312072 A1 | 11/2018 | Yang et al. | |
| 2019/0006862 A1* | 1/2019 | Hamilton, IV | H02J 7/0045 |
| 2019/0009683 A1 | 1/2019 | Saito et al. | |
| 2019/0011926 A1 | 1/2019 | Konishi et al. | |
| 2019/0031037 A1 | 1/2019 | Fendt | |
| 2019/0047434 A1 | 2/2019 | Oh et al. | |
| 2019/0061541 A1* | 2/2019 | Penilla | G06Q 20/18 |
| 2019/0156407 A1* | 5/2019 | Igata | G06Q 30/0284 |
| 2019/0157881 A1* | 5/2019 | Velderman | H02J 7/0027 |
| 2019/0197608 A1* | 6/2019 | Iwai | G01R 31/382 |

FOREIGN PATENT DOCUMENTS

| | | |
|---|---|---|
| CN | 104583719 A | 4/2015 |
| CN | 104779680 A | 7/2015 |
| EP | 2578997 A1 | 4/2013 |
| EP | 3090905 A1 | 11/2016 |
| JP | 2000-341868 A | 12/2000 |
| JP | 2003-262525 A | 9/2003 |
| JP | 2006-331405 A | 12/2006 |
| JP | 2007-116799 A | 5/2007 |
| JP | 2008-009492 A | 1/2008 |
| JP | 2010-4666 A | 1/2010 |
| JP | 2010-107203 A | 5/2010 |
| JP | 2010-142026 A | 6/2010 |
| JP | 2010-230615 A | 10/2010 |
| JP | 2010-540907 A | 12/2010 |
| JP | 2011-83166 A | 4/2011 |
| JP | 2011-197932 A | 10/2011 |
| JP | 2011-253727 A | 12/2011 |
| JP | 2012-145499 A | 8/2012 |
| JP | 2012-211903 A | 11/2012 |
| JP | 2013-15933 A | 1/2013 |
| JP | 5362930 B1 | 12/2013 |
| JP | 2014-3803 A | 1/2014 |
| JP | 2014-524618 A | 9/2014 |
| JP | 2014-219749 A | 11/2014 |
| JP | 2014-225167 A | 12/2014 |
| JP | 2015-15875 A | 1/2015 |
| JP | 2015-191425 A | 11/2015 |
| TW | 201321230 A1 | 6/2013 |
| TW | 201337805 A | 9/2013 |
| TW | I413015 B | 10/2013 |
| WO | 00/59230 A1 | 10/2000 |
| WO | 2013024484 A1 | 2/2013 |
| WO | 2013080211 A1 | 6/2013 |
| WO | 2015001930 A1 | 1/2015 |
| WO | 2017/086161 A1 | 5/2017 |
| WO | 2017/086172 A1 | 5/2017 |
| WO | 2017/086173 A1 | 5/2017 |

OTHER PUBLICATIONS

The extended European search report (EESR) dated Dec. 3, 2018 in a related European patent application.
The extended European search report (EESR) dated Nov. 14, 2018 in a related European patent application.
An English translation of the International Search Report of a related international application PCT/JP2016/082565 dated Dec. 27, 2016.
An English translation of the Written Opinion of a related international application PCT/JP2016/082565 dated Dec. 27, 2016.
An English translation of the International Search Report of a related international application PCT/JP2016/082675 dated Jan. 10, 2017.
An English translation of the Written Opinion of a related international application PCT/JP2016/082675 dated Jan. 10, 2017.
An English translation of the International Search Report of a related international application PCT/JP2016/082676 dated Jan. 24, 2017.
An English translation of the Written Opinion of a related international application PCT/JP2016/082676 dated Jan. 24, 2017.
An English translation of the International Search Report of PCT/JP2016/082677 dated Jan. 31, 2017.
An English translation of the Written Opinion of PCT/JP2016/082677 dated Jan. 31, 2017.
The Taiwanese Office Action of a related Taiwanese application 105136769 dated Jan. 22, 2018.
The extended European search report (EESR) dated Nov. 15, 2018 in a counterpart European patent application.
The U.S. Office Action dated May 16, 2019 in a related U.S. Appl. No. 15/759,226.
The Taiwanese Office Action of a related Taiwanese application 105136976 dated Feb. 12, 2018.
The Japanese office action letter dated Jun. 25, 2019 in a counterpart Japanese patent application.
The U.S. Office Action dated Aug. 7, 2019 in a related U.S. Appl. No. 15/759,223.
The U.S. Office Action dated Aug. 21, 2019 in a related U.S. Appl. No. 15/759,220.
The U.S. Office Action dated Nov. 15, 2019 in a related U.S. Appl. No. 15/759,226.
The U.S. Office Action dated Nov. 29, 2019 in a related U.S. Appl. No. 15/759,223.

* cited by examiner

| St ID | Bat ID | 08:00 | 08:10 | 08:20 | 08:30 | 08:40 | 08:50 | 09:00 | 09:10 | ⋮ |
|---|---|---|---|---|---|---|---|---|---|---|
| A | 1 | 1400 | 1450 | 1500 | 1550 | 1600 | 1600 | 1600 | 1600 | ⋮ |
| | 7 | 1400 | 1450 | 1500 | 1550 | 1600 | 1600 | 1600 | 1600 | ⋮ |
| | 2 | - | - | - | - | - | 600 | 650 | 700 | ⋮ |
| | 4 | - | - | - | - | - | 600 | 650 | 700 | ⋮ |
| | 15 | 400 | 450 | 500 | 550 | 600 | 650 | 700 | 750 | ⋮ |
| B | 5 | 1450 | 1500 | 1550 | 1600 | 1600 | 1600 | 1600 | 1600 | ⋮ |
| | 3 | 1350 | 1400 | 1450 | 1500 | 1550 | 1600 | 1600 | 1600 | ⋮ |
| | 19 | 400 | 450 | 500 | 550 | 600 | 650 | 700 | 750 | ⋮ |
| C | 11 | 1500 | 1550 | 1600 | 1600 | 1600 | 1600 | 1600 | 1600 | ⋮ |
| | 6 | 1300 | 1350 | 1400 | 1450 | 1500 | 1550 | 1600 | 1600 | ⋮ |
| | 8 | 1450 | 1500 | 1550 | 1600 | 1600 | 1600 | 1600 | 1600 | ⋮ |
| ⋮ | ⋮ | ⋮ | ⋮ | ⋮ | ⋮ | ⋮ | ⋮ | ⋮ | ⋮ | |

Clock time

BATTERY RESERVATION DEVICE AND BATTERY RESERVATION METHOD

FIELD

The present invention relates to a battery reservation device and a battery reservation method for reserving the rental of batteries at a battery station, for use in a power consumption element in which a plurality of battery packs are mounted.

BACKGROUND

Recent years have seen systems constructed in which battery packs installed in a vehicle such as an electric motorcycle or an electric bicycle are used and then exchanged at a battery station where charged batteries are available.

When battery packs are thus rented out, a system is sometimes used for reserving a battery pack rental at a battery station.

For example, Patent Literature 1 discloses load estimation and management in an electric automobile network for predicting demand for battery service in an electric vehicle network.

CITATION LIST

Patent Literature

Patent Literature 1: JP-A 2014-524618

SUMMARY

However, the following problems are encountered with the above-mentioned conventional method.

In predicting demand for a battery service as disclosed in the above publication, when a busy battery service location is selected, adjustment is made by recommending an alternative battery service location to the user of the vehicle.

However, with a method such as this, it is possible to accept reservations only for battery packs already at the battery service location, and it is not possible to make adjustments that take into account battery packs that are already scheduled to be returned.

It is an object of the present invention to provide a battery reservation device and a battery reservation method that afford more flexible reservation acceptance processing by accepting reservations for battery packs scheduled to be returned.

The battery reservation device pertaining to the first invention is a battery reservation device that accepts reservations for battery packs that are rented out from a battery station and are installed in a power consumption element, the device comprising a battery state acquisition component, a scheduled return time acquisition component, a remaining battery charge prediction component, a charging speed acquisition component, and a reservation acceptance component. The battery state acquisition component acquires the current remaining battery charge of the battery packs scheduled to be returned to the battery station. The scheduled return time acquisition component acquires the scheduled return time at which the battery packs scheduled to be returned will be returned to the battery station. The remaining battery charge prediction component predicts the remaining battery charge of the battery packs when they are returned to the battery station, on the basis of the current remaining battery charge of the battery packs acquired by the battery state acquisition component and the scheduled return time of the battery packs acquired by the scheduled return time acquisition component. The charging speed acquisition component acquires the charging speed of the charger that charges the battery packs at the battery station. The reservation acceptance component accepts a rental reservation for the battery packs scheduled to be returned on the basis of the remaining battery charge at the time of return predicted by the remaining battery charge prediction component and the charging speed by the charger acquired by the charging speed acquisition component.

Here, in a battery reservation device that accepts a reservation for battery exchange at a battery station where battery packs are available, battery packs that are scheduled to be returned are reflected in reservation information as battery packs that can be reserved, on the basis of other reservation information for which reservation has already been established (such as the current remaining battery charge and the scheduled return time).

The power consumption element here includes, for example, vehicles such as electric motorcycles, electric bicycles, electrically assisted bicycles, electric unicycles, electric automobiles (EVs), and PHVs (plug-in hybrid vehicles), as well as various other kinds of electrical product that are driven by exchangeable batteries.

Also, the current remaining battery charge acquired by the battery state acquisition component may be acquired from a vehicle or other such power consumption element, for example, or may be acquired from a management center or the like that manages the usage state of the battery packs that are in use.

Also, the scheduled return time acquired by the scheduled return time acquisition component may be acquired from information inputted by the person making the reservation, or may be automatically calculated using current location information about the vehicle or other such power consumption element.

Also, the charging speed of the charger acquired by the charging speed acquisition component may be acquired directly from the battery station where the charger is installed, or may be acquired from a server or the like that stores information about the battery stations.

Consequently, reservations for a battery pack that has not yet been returned to the battery station can be accepted by estimating when it will be returned to the battery station and what its subsequent remaining battery charge will be, on the basis of the current remaining battery charge, scheduled return time to the battery station, estimated value for the remaining battery charge at the time of return, and the charging speed of the charger at the battery station where the return is scheduled.

As a result, it is possible to increase the number of choices of battery packs that can be reserved, as compared with prior art, so that more flexible reservation acceptance processing becomes possible.

The battery reservation device pertaining to the second invention is the battery reservation device pertaining to the first invention, further comprising a reservation possibility determination component that determines whether or not a battery pack scheduled for return is rentable out, on the basis of the remaining battery charge at the time of return predicted by the remaining battery charge prediction component and the charging speed by the charger acquired by the charging speed acquisition component.

Here, it is determined whether or not a battery pack scheduled to be returned is a battery pack that is rentable out and matches conditions inputted by the person making the reservation, etc., on the basis of other reservation information for which reservation has already been established (such as the current remaining battery charge and the scheduled return time).

Consequently, battery packs scheduled to be returned are added to reservation information as information indicating that they can be reserved, and it can be determined whether or not a battery pack matching conditions inputted by the person making the reservation, etc., can be rented out.

The battery reservation device pertaining to the third invention is the battery reservation device pertaining to the first or second invention, further comprising a charging completion time calculator that calculates the charging completion time for a battery pack scheduled to be returned, on the basis of the remaining battery charge at the time of return predicted by the remaining battery charge prediction component and the charging speed by the charger acquired by the charging speed acquisition component.

Here, after a battery pack scheduled to be returned to the battery station has been returned to the battery station, the charging completion time at which a fully charged state will be attained is calculated.

Consequently, when a reservation is accepted, the calculated charging completion time can be presented to the person making the reservation who wants to exchange for a fully charged battery pack whose charging has been completed. Therefore, a battery pack that has not yet been returned can be presented as an option in the reservation information.

The battery reservation device pertaining to the fourth invention is the battery reservation device pertaining to any of the first to third inventions, further comprising an actual return time acquisition component, an actual remaining battery charge acquisition component, and a reservation information update component. The actual return time acquisition component acquires the actual return time at which the battery pack was returned to the battery station. The actual remaining battery charge acquisition component acquires the actual remaining battery charge of the battery pack returned to the battery station. The reservation information update component updates information related to scheduled battery pack rental on the basis of the actual return time acquired by the actual return time acquisition component and the actual remaining battery charge acquired by the actual remaining battery charge acquisition component.

Here, if there is a discrepancy between the scheduled return time and the remaining battery charge for the battery packs included in the above-mentioned reservation information and the time when the battery packs were actually returned and the remaining battery charge at the time of return, then information about the actual return time and the remaining battery charge is acquired and the reservation information is updated.

Consequently, any discrepancy error in the reservation information can be eliminated by updating the scheduled return time and the remaining battery charge calculated as estimated values to the actual correct values, and accurate reservation information can be presented to the user.

The battery reservation device pertaining to the fifth invention is the battery reservation device pertaining to any of the first to fourth inventions, wherein the battery state acquisition component further acquires one or more of the following: the unique ID of the battery pack, remaining capacity history information about the battery pack, voltage history, current history, and temperature history.

Here, the battery state acquisition component that acquires the remaining capacity of the battery pack further acquires information such as the ID unique to the battery pack, the remaining capacity history information for the battery pack, voltage history, current history, temperature history, and so forth.

Here, the remaining capacity history information for the battery pack refers to history information about the past remaining battery charge of the battery pack. Also, voltage history and current history mean history information indicating changes in voltage and current during use of the battery pack. Temperature history means history information indicating a temperature change in the battery pack in the past.

Consequently, the accuracy of the estimated value of the remaining battery charge when a battery pack is returned to the battery station can be improved by acquiring ID information, history information, and the like.

The battery reservation device pertaining to the sixth invention is the battery reservation device pertaining to any of the first to fifth inventions, wherein the power consumption element is a vehicle, including an electric motorcycle, an electric bicycle, an electrically assisted bicycle, an electric automobile, and a PHV (plug-in hybrid vehicle).

Here, a vehicle such as an electric motorcycle or an electric bicycle is used as a specific power consumption element.

Consequently, with a vehicle in which battery packs whose remaining capacity is low are exchanged for charged battery packs at a specific battery station or the like, for example, it is possible to increase options for battery pack exchange reservation, and more flexible reservation acceptance processing becomes possible.

The battery reservation device pertaining to the seventh invention is the battery reservation device pertaining to the sixth invention, further comprising a location information acquisition component that acquires current location information for the vehicle, and a travel time calculator that calculates the travel time from the current location to the reserved battery station on the basis of the current location information about the vehicle acquired by the location information acquisition component.

Here, when a vehicle is used as a power consumption element, current location information about the vehicle is acquired and the travel time is calculated from the distance from the current location to the reserved battery station.

Here, the current location of the vehicle used for the calculating the travel time can be found using GPS (global positioning system) or the like, for example.

Consequently, the scheduled return time of a battery pack to the reserved battery station can be calculated by using the calculated travel time.

The battery reservation device pertaining to the eighth invention is the battery reservation device pertaining to the seventh invention, wherein the scheduled return time acquisition component calculates the scheduled return time of the battery pack to the battery station on the basis of the travel time calculated by the travel time calculator.

Here, the scheduled return time acquisition component uses the travel time calculated by the travel time calculator to calculate the scheduled time for returning the battery pack to the battery station.

Here, the travel time to each battery station is calculate from distance from the current location to each battery station and the average speed over the past hour of the vehicle (such as an electric motorcycle, an electric automobile, an electric bicycle, an electrically assisted bicycle, or the like), for example.

Consequently, even if the scheduled return time for the battery pack is not inputted by the person making the reservation, the scheduled return time of the battery pack can be automatically calculated.

The battery reservation device pertaining to the ninth invention is the battery reservation device pertaining to the seventh or eighth invention, wherein the remaining battery charge prediction component calculates the amount of power required to reach a battery station on the basis of the current location information about the vehicle acquired by the location information acquisition component and the average power consumption of the vehicle.

Here, for example, the amount of power required to reach the reserved battery station is calculated by using the average distance traveled (power consumption) per 1 wh in the most recent specific length of time for vehicle.

This improves the accuracy of the estimated value of the remaining battery charge of the battery pack when returned to the battery station.

The battery reservation method pertaining to the tenth invention is a battery reservation method in which reservations are accepted for battery packs that are installed in a power consumption element and are rented out at battery stations, the method comprising a battery state acquisition step, a scheduled return time acquisition step, a remaining battery charge prediction step, a charging speed acquisition step, and a reservation acceptance step. The battery state acquisition step involves acquiring the current remaining battery charge of the battery packs scheduled to be returned to the battery station. The scheduled return time acquisition step involves acquiring the scheduled return time at which the battery packs scheduled to be returned will be returned to the battery station. The remaining battery charge prediction step of predicting the remaining battery charge of the battery packs when they are returned to the battery station, on the basis of the current remaining battery charge of the battery packs acquired by the battery state acquisition step and the scheduled return time of the battery packs acquired by the scheduled return time acquisition step. The charging speed acquisition step involves acquiring the charging speed of the charger that charges the battery packs at the battery station. The reservation acceptance step involves accepting a rental reservation for the battery packs scheduled to be returned on the basis of the remaining battery charge at the time of return predicted by the remaining battery charge prediction step and the charging speed by the charger acquired by the charging speed acquisition step.

Here, in a battery reservation method for accepting a reservation for performing battery exchange at a battery station where battery packs are available, battery packs that are scheduled to be returned are reflected in reservation information as battery packs that can be reserved, on the basis of other reservation information for which reservation has already been established (such as the current remaining battery charge and the scheduled return time).

The power consumption element here includes, for example, vehicles such as electric motorcycles, electric bicycles, electrically assisted bicycles, electric unicycle, electric automobiles (EVs), and PHVs (plug-in hybrid vehicles), as well as various other kinds of electrical product that are driven by exchangeable batteries.

Also, the current remaining battery charge acquired in the battery state acquisition step may be acquired from a vehicle or other such power consumption element, for example, or may be acquired from a management center or the like that manages the usage state of the battery packs that are in use.

Also, the scheduled return time acquired in the scheduled return time acquisition step may be acquired from information inputted by the person making the reservation, or may be automatically calculated using current location information about the vehicle or other such power consumption element.

Also, the charging speed of the charger acquired in the charging speed acquisition step may be acquired directly from the battery station where the charger is installed, or may be acquired from a server or the like that stores information about the battery stations.

Consequently, reservations for a battery pack that has not yet been returned to the battery station can be accepted by estimating when it will be returned to the battery station and what its subsequent remaining battery charge will be, on the basis of the current remaining battery charge, scheduled return time to the battery station, estimated value for the remaining battery charge at the time of return, and the charging speed of the charger at the battery station where the return is scheduled.

As a result, it is possible to increase the number of choices of battery packs that can be reserved, as compared with prior art, so that more flexible reservation acceptance processing becomes possible.

Effects

With the battery reservation device pertaining to the present invention, more flexible reservation acceptance processing can be performed by enabling the acceptance of reservation for battery packs scheduled to be returned.

BRIEF DESCRIPTION OF THE DRAWINGS

FIG. 4 is a reservation information table showing the remaining battery charge at each elapsed time for the battery packs held in each battery station;

DETAILED DESCRIPTION

The battery reservation device pertaining to an embodiment of the present invention will now be described through reference to FIGS. 1 to 7.

Figure 1:
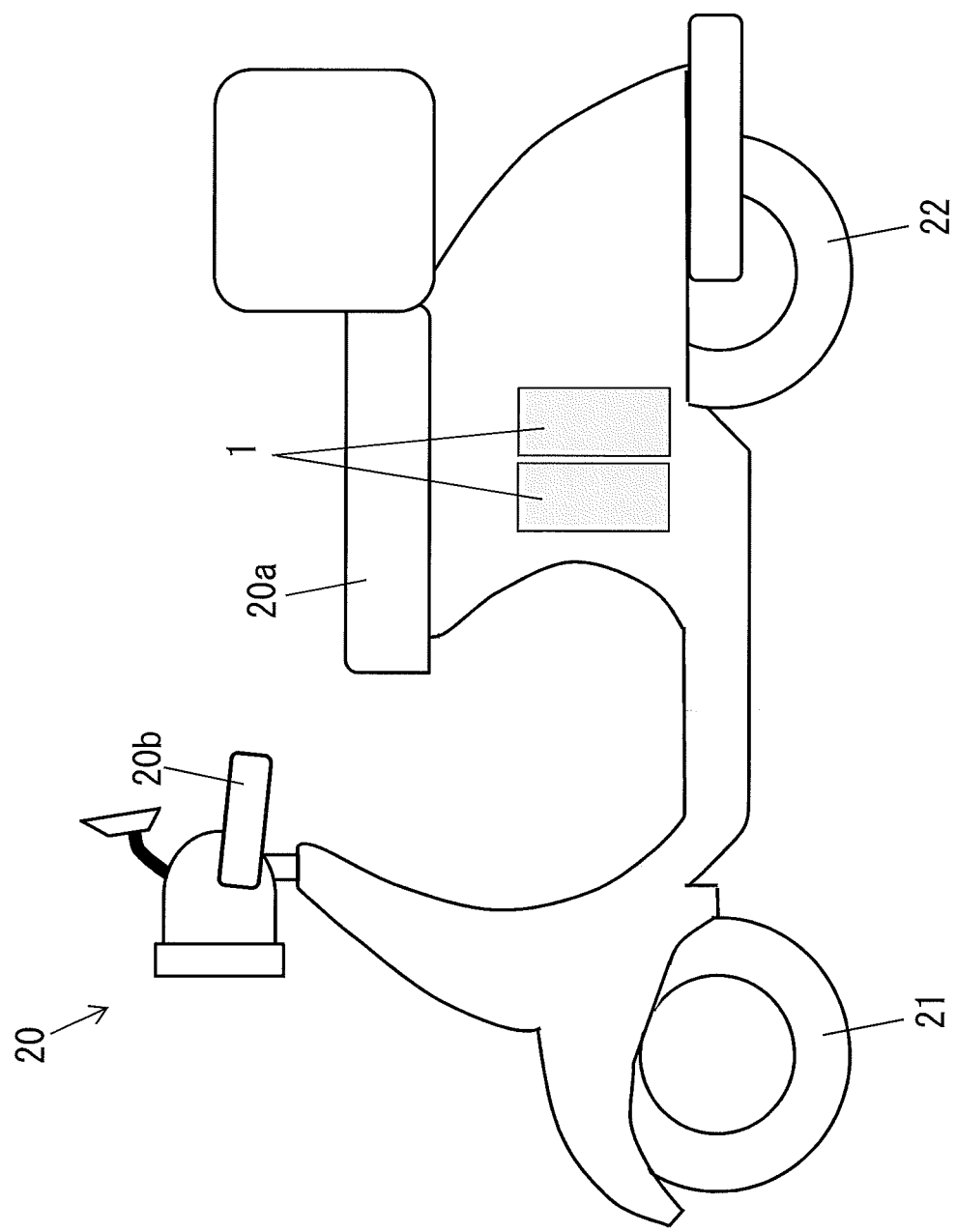
FIG. 1 is a diagram showing the configuration of a vehicle in which are installed battery packs that can be reserved for rental with the battery reservation device pertaining to an embodiment of the present invention.

The battery reservation device 10 pertaining to this embodiment accepts a reservation for the exchange (rental) of battery packs 1 installed in an exchangeable state in a vehicle 20 such as the electric motorcycle shown in FIG. 1.

In this embodiment, the exchange of the battery packs 1 installed in the vehicle 20 will be described as synonymous with the rental of the battery packs 1.

As shown in FIG. 1, the battery packs 1 are secondary batteries for supplying power to the vehicle 20, and two of them are installed in an exchangeable state in the vehicle 20. The battery packs 1 are repeatedly used by being charged with chargers 31 (see FIG. 2) installed in specific battery stations 30a to 30c.

Figure 2:
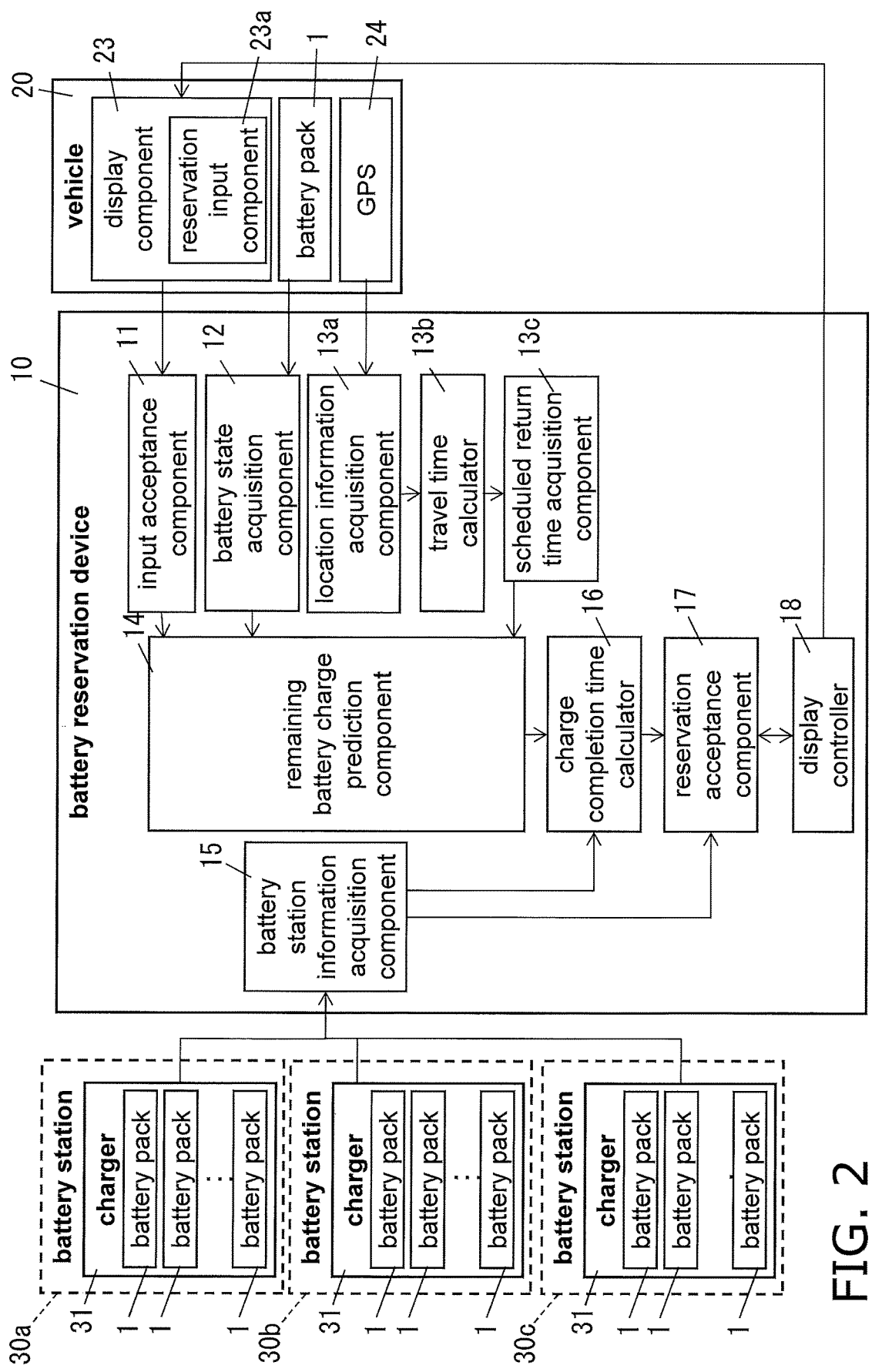
FIG. 2 is a block diagram showing the configuration of the battery reservation device for reserving the rental of a plurality of battery packs installed in the vehicle in FIG. 1.

The vehicle 20 is an electric motorcycle that is propelled when supplied with power from the two battery packs 1 installed under a seat 20a, and comprises a front wheel 21, a rear wheel (drive wheel) 22, a display component 23 (see FIG. 2), and a GPS (global positioning system) 24 (see FIG. 2).

The front wheel 21 is a steered wheel provided between the front part of the vehicle 20 and the road surface, and the travel direction can be varied by changing the orientation in conjunction with the orientation of a handle bar 20b.

The rear wheel 22 is a drive wheel provided between the road surface and the rear part of the vehicle 20 where the battery packs 10 are installed, and is rotationally driven by a motor (not shown).

The display component 23 is a display device provided near the center portion of the handle bar 20b of the vehicle 20, and displays the remaining battery charge of the two battery packs 1 installed in the vehicle 20, vehicle speed, and so forth. The display component 23 is constituted by a touch panel type of liquid crystal display device, for example.

Also, the display component 23 has a reservation input component 23a to which reservation information for reserving battery exchange is inputted to the battery reservation device 10. The display component 23 then displays a reservation input screen for reserving the battery stations 30a to 30c, such as a reservation input screen S1 (see FIG. 3) (discussed below).

When the remaining battery charge of the two battery packs 1 decreases, the reservation input component 23a inputs information such as the number of battery packs 1 that need to be exchanged, the total power amount, when the user wants to receive the battery packs, and so forth from the person making the reservation. The reservation input component 23a then selects the battery stations 30a to 30c to be reserved by the person making the reservation via the reservation input screen S1 displayed on the display component 23.

Figure 3:
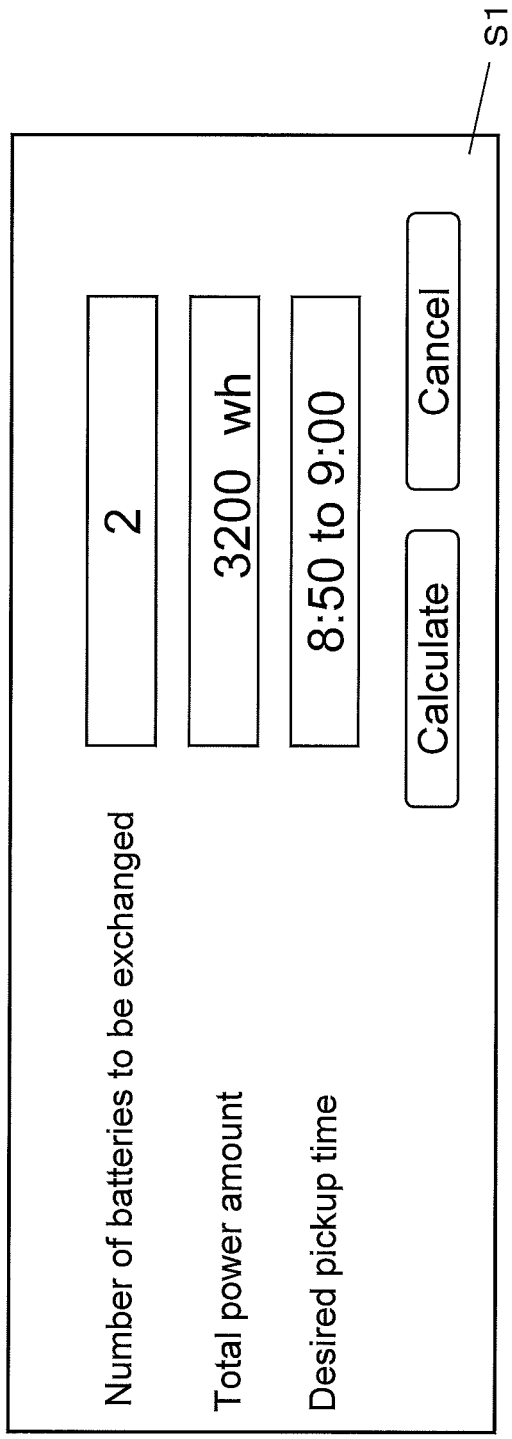
FIG. 3 is a view showing a reservation input screen displayed on a display component of a vehicle when reserving the rental of battery packs with the battery reservation device in FIG. 2.

On the reservation input screen S1 shown in FIG. 3, the number of battery packs 1 that need to be exchanged is inputted as "2," the total power amount as "3200 wh," and the desired reception time as "8:50 to 9:00."

Also, although the number of battery stations 30a to 30c shown in FIG. 2 is three for the purpose of description, the number of battery stations that can be reserved with the battery reservation device 10 in this embodiment is not limited to this. For instance, if the installation density of battery stations varies from one area to the next, all of the battery stations set up within a radius of a few kilometers around the current location of the vehicle 20 may be reserved.

The GPS 24 is installed in the vehicle 20, receives a signal from a GPS satellite, and acquires current location information for the vehicle 20. The GPS 24 then transmits the acquired current location information to a travel time calculator 17 of the battery reservation device 10.

Configuration of Battery Reservation Device 10

The battery reservation device 10 is a device that accepts exchange reservations for battery packs 1 that are charged or being charged and are stored in the plurality of battery stations 30a to 30c, and is installed in each of the battery stations 30a to 30c, for example. As shown in FIG. 2, the battery reservation device 10 comprises an input acceptance component 11, a battery state acquisition component 12, a location information acquisition component 13a, travel time calculator 13b, a scheduled return time acquisition component 13c, a remaining battery charge prediction component 14, a battery station information acquisition component 15, a charge completion time calculator 16, a reservation acceptance component (reservation acceptance component, reservation information update component, reservation possibility determination component) 17, and a display controller 18.

In this embodiment, the battery packs 1 reserved by the battery reservation device 10 include those that have been charged by the time of reservation, and those that are being charged (see the table in FIG. 4).

The input acceptance component 11 accepts reservation information related to the exchange of the battery packs 1 inputted by the person making the reservation via the display component 23 (reservation input component 23a) of the vehicle 20. More specifically, the input acceptance component 11 presents one or more of the battery stations 30a to 30c satisfying the needs of the person making the reservation as reservation destination candidates on the basis of the various information inputted on the reservation input screen S1 shown in FIG. 3.

Consequently, the person making the reservation can select and reserve one battery station 30a, etc., from among the battery stations 30a to 30c that satisfy the desired conditions on the basis of the distance, the travel time, the cost of the exchange, and other such conditions.

The battery state acquisition component 12 acquires the state of the battery packs 1 (the remaining battery charge of the current battery packs 1, etc.) installed in the vehicle 20 that accepted the reservation. More specifically, the battery state acquisition component 12 acquires, in addition to the remaining battery charge, a unique ID given to each battery pack 1, a unique ID given to each vehicle 20, history information about the remaining battery charge of the battery packs 1, voltage and current history information, temperature information, and the like.

The unique ID attached to each battery pack 1 here is a symbol or number indicating the type, serial number, model, etc. of the battery pack 1, and is used as information that tells what the performance of the battery pack 1 is. The unique ID assigned to each vehicle 20 is a symbol or number indicating the make, VIN, model, etc., of the vehicle 20, and is used to tell what the power consumption of the vehicle 20 (distance traveled per 1 wh) is.

The history information about the remaining battery charge of the battery packs 1 is used to learn how the remaining battery charge of the installed battery packs 1 has changed in the past. The history information about the voltage and current is used to learn the installed battery packs 1 were used in the past. The temperature information is information indicating past changes in the temperature of the battery packs 1, and is used to learn how the battery packs 1 were used in the past.

As described above, with the battery reservation device 10 in this embodiment, various kinds of information that tell how the battery packs 1 were used in the past are acquired in addition to information about the remaining charge of the batteries installed in the vehicle 20 at the completion of the reservation.

This makes improves the accuracy of predicting the remaining charge of the battery packs 1 when the vehicle 20 arrives at the reserved battery stations 30*a* to 30*c*. Estimation of the remaining charge of the battery packs 1 at the time of arrival at the battery stations 30*a* to 30*c* is performed by the remaining battery charge prediction component 14 (discussed below).

The location information acquisition component 13*a* acquires information about the current location of the vehicle 20 from the GPS 24 installed in the vehicle 20. The location information acquisition component 13*a* then transmits the acquired current location information to the travel time calculator 13*b*.

The travel time calculator 13*b* calculates the travel time and the travel distance from the current location of the vehicle 20 to the reserved battery station 30*a*, etc., on the basis of the current location information for the vehicle 20 acquired from the location information acquisition component 13*a*. More specifically, the travel time calculator 13*b* calculates the travel distance from the current location to the reserved battery station 30*a*, etc., using previously stored map information, and also calculates the travel distance of the vehicle 20 over the past hour using the average speed over the past hour of the vehicle 20.

In addition to the average speed over the past hour, the average speed ever since the battery packs 1 were installed until now, the average speed reflecting the crowding situation, or the like may be used as the average speed of the vehicle 20.

The scheduled return time acquisition component 13*c* calculates how long it will take the vehicle 20 to arrive at the battery station 30*a*, etc., that is, the scheduled return time of the battery packs 1, on the basis of the travel time to the reserved battery station 30*a*, etc., calculated by the travel time calculator 13*b*.

Figure 5:
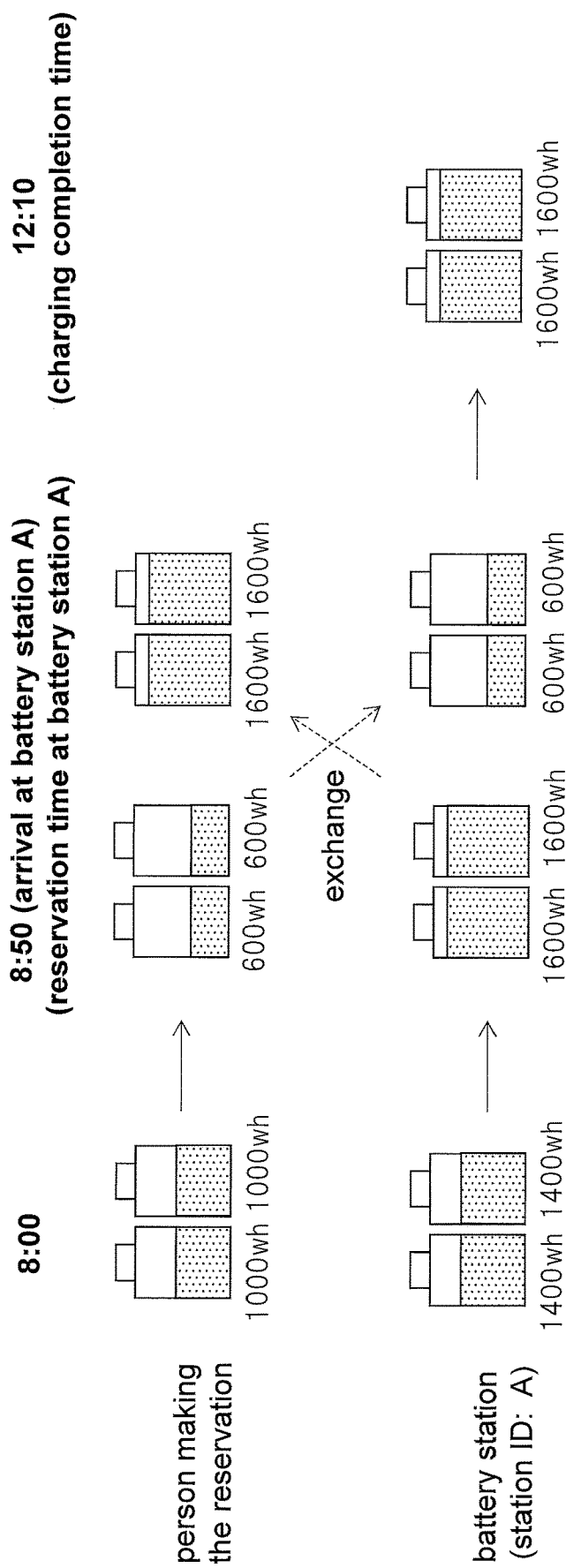
FIG. 5 is a diagram showing the exchange of used battery packs for battery packs held in the battery station at a reserved battery station.

For example, if the reservation clock time is 8:00 and the travel time to the reserved battery station 30*a*, etc., is 50 minutes, then the scheduled return time is calculated as 8:50 (see FIG. 5).

The remaining battery charge prediction component 14 predicts the remaining charge of the battery packs 1 at the time of their return on the basis of the state (remaining battery charge, etc.) of the battery packs 1 installed in the vehicle 20 acquired by the battery state acquisition component 12, and the scheduled return time of the battery packs 1 to the battery station 30*a*, etc., acquired by the scheduled return time acquisition component 13*c*.

More specifically, the remaining battery charge prediction component 14 calculates the estimated value of the remaining battery power at the scheduled return time by subtracting the estimated value of the amount of power required to arrive at the reserved battery station 30*a*, etc., from the remaining battery charge of the battery packs 1 at the time of reservation.

As shown in FIG. 1, when a plurality of battery packs 1 are installed in the vehicle 20, the remaining battery charge per battery pack 1 can be calculated by dividing the amount of power required to arrive at the battery station 30*a*, etc., into equal parts and then subtracting.

Also, the estimated value of the amount of power required to arrive at the reserved battery station 30*a*, etc., is calculated using the travel distance (planar distance, height difference) to the reserved battery station 30*a*, history information such as voltage, current, temperature, and so forth indicating the usage condition of the vehicle 20 in the past, the average power consumption of the vehicle 20, and the like.

The estimated value of the amount of power required to arrive is calculated as the simplest calculation method by using the following relational formula (1) and using the average power consumption of the vehicle 20 and the travel distance to the reserved battery station 30*a*, etc.

$$(\text{Amount of power (wh) required to arrive at battery station}) = (\text{distance (km) between battery station and current vehicle location}) \div (\text{average power consumption of vehicle (km/wh)}) \quad (1)$$

The battery station information acquisition component (charging speed acquisition component, actual return time acquisition component, actual remaining battery charge acquisition component) 15 acquires information about the battery packs 1 that have been charged or are being charged by the charger 31, and about the chargers 31 installed in each of the battery stations 30*a* to 30*c*.

More specifically, the battery station information acquisition component 15 acquires information related to the charging speed of the chargers 31 installed in each of the battery stations 30*a* to 30*c*.

In the reservation information table shown in FIG. 4, a common charging speed of 300 wh/h is acquired as the charging speed of the plurality of battery chargers 31 installed at the battery stations 30*a* to 30*c* (corresponding to station IDs A to C).

Also, the battery station information acquisition component 15 acquires the time (actual return time) when the vehicle 20 actually arrives at the reserved battery station 30*a*, etc., from the battery station 30*a* etc., where the vehicle 20 has arrived. The battery station information acquisition component 15 also acquires the actual remaining charge of the battery packs 1 at the point when the vehicle 20 has actually arrived at the reserved battery station 30*a*, etc., from the battery station 30*a*, etc., where the vehicle 20 has arrived.

Here, information related to the actual arrival time of the vehicle 20 at the reserved battery station 30*a* is used to confirm whether or not there is a discrepancy with the scheduled return time calculated by the scheduled return time acquisition component 13*c*.

The information related to the actual remaining battery charge at the point when the vehicle 20 has actually arrived (at the time of return) to the reserved battery station 30*a* is used to confirm whether or not there is a discrepancy with the estimated value for the remaining battery charge at the time of return calculated by the remaining battery charge prediction component 14.

Consequently, the estimated values for the scheduled return time and the remaining battery charge at the time of return can be updated to accurate numerical values at the point when the battery packs 1 are actually returned, thereby improving the accuracy of the reservation information table (see FIG. 4).

The charge completion time calculator 16 calculates how long it will take to reach a fully charged state after the battery packs 1 are returned to the battery station 30*a*, etc., on the basis of the estimated value for the remaining charge of the battery packs 1 at the time of return calculated by the remaining battery charge prediction component 14 and the charging speed of the charger 31 acquired by the battery station information acquisition component 15.

For example, in the reservation information table shown in FIG. 4, a state in which the remaining battery charge is 1600 wh is regarded as a fully charged state (charging completed state).

The reservation acceptance component (reservation acceptance component, reservation information update component) 17 adds information about the battery packs 1 scheduled to be returned as reservation information on the basis of the estimated value for the remaining battery charge at the scheduled return time acquired via the charge completion time calculator 16 and the charging speed of the battery charger 31 installed at the battery station 30a, etc.

More specifically, the information about the battery packs 1 having the battery IDs "2" and "4" for the station ID "A" (assigned to each of the battery stations 30a to 30c) is added to the reservation information table shown in FIG. 4.

In the reservation information table shown in FIG. 4, information is added indicating that the reservation time is 8:00, two battery packs 1 are scheduled to be returned to the battery station 30a at 8:50 (50 minutes later), and the remaining battery charge at the time of return is 600 wh.

Consequently, information about the battery packs 1 (IDs "2" and "4") that was not originally reflected in the reservation information up to 8:50 when the battery packs 1 are actually returned to the battery station 30a, etc., can be presented as information indicating that reservation is possible from the reservation time (8:00).

As a result, since a person who wishes to reserve from 8:00 to 8:49 has more choices of rentable battery packs 1 than before, there is greater latitude in the processing for accepting a rental reservation for the battery packs 1.

Here, it is supposed that there will be a discrepancy in the scheduled return time calculated by the scheduled return time acquisition component 13c according to traffic conditions and the like from the current location of the vehicle 20 to the reserved battery station 30a. Likewise, it is assumed that there will be a discrepancy in the amount of power consumed up to the arrival at the battery station 30a according traffic conditions and the like with respect to the estimated value for the remaining battery charge calculated by the remaining battery charge prediction component 14.

In view of this, the reservation acceptance component 17 acquires information related to the actual return time and the actual remaining battery charge acquired by the battery station information acquisition component 15, and updates the information in the reservation information table shown in FIG. 4.

For example, if the scheduled return time calculated by the scheduled return time acquisition component 13c is 8:50 and the time at which the battery packs 1 are actually returned to the reserved battery station 30a, etc., is 8:55, the information in the reservation information table is updated so as to eliminate the 5-minute discrepancy and correct the return time to be more accurate.

If the estimated value for the remaining battery charge calculated by the remaining battery charge prediction component 14 is 600 wh and the remaining battery charge at the point when the battery packs 1 are actually returned to the reserved battery station 30a, etc., is 610 wh, the information in the reservation information table is updated so as to eliminate the discrepancy of 10 wh and correct the remaining battery charge to be more accurate.

Consequently, the accuracy of the reservation information can be improved by correcting the reservation information table to accurate numerical values.

The display controller 18 controls the display component 23 of the vehicle 20 so as to display the reservation input screen S1 on which the reservation information is inputted. The display controller 18 also controls the display component 23 so as to present the battery station 30a, etc., that holds battery packs 1 satisfying the conditions inputted via the reservation input screen S1 as a candidate for the reservation destination.

Consequently, the person making the reservation can reserve a rental of the battery packs 1 by selecting the desired battery station 30a, etc., from among the options displayed on the display component 23.

The battery reservation device 10 in this embodiment has the configuration shown in FIG. 2, and calculates the estimated value for the remaining charge of the battery packs 1 at the time of return and the scheduled return time of the battery packs 1 to the battery station 30a, etc., on the basis of information related to the current remaining battery charge and the current location of the battery packs 1 that are installed in the vehicle 20 for which reservation has been completed and are scheduled to be returned. The battery reservation device 10 then adds information related to the estimated value for the remaining charge of the battery packs 1 at the time of return and the scheduled return time of the battery packs 1 to the battery station 30a, etc., to the information in the reservation information table (see FIG. 4) indicating rental reservation information about the battery packs 1.

The processing performed in the exchange of the battery packs 1 at the battery station 30a from the actual reservation acceptance will now be described through reference to FIGS. 4 and 5.

That is, as shown in FIG. 5, when the person making the reservation reserves the exchange of the battery packs 1 via the display component 23 of the vehicle 20 at 8:00, the remaining battery charge of the two battery packs 1 installed in the vehicle 20 at that point is 1000 wh.

On the other hand, at 8:00 (when the reservation is completed), the two battery packs 1 held in the reserved battery station 30a (corresponds to a station ID of A) are being charged and their remaining battery charge is 1400 wh.

The scheduled time at which the vehicle 20 arrives at the battery station 30a is calculated to be 8:50. Therefore, it is estimated that the remaining battery charge of the two battery packs 1 installed in the vehicle 20 at this point has dropped down to 600 wh by the time they reach the battery station 30a.

That is, the amount of power required to arrive at the battery station 30a from the current location is calculated to be 400 wh.

Meanwhile, by the time the vehicle 20 arrives at the battery station 30a, the two reserved battery packs 1 are in a fully charged state with a remaining battery charge of 1600 wh.

That is, as shown in FIG. 4, at 8:00 (when the reservation is received), the reserved battery packs 1 (corresponding to IDs "1" and "7") have a remaining battery charge of 1400 wh, and since the charging speed of the charger 31 is 300 wh/h, it is expected that the battery will be fully charged at 8:40.

Then, as shown in FIG. 5, at 8:50, the two installed battery packs 1 are taken out of the vehicle 20 that has arrived at the battery station 30a, and these exchanged for the two battery packs 1 with a remaining battery capacity of 1600 wh (IDs "1" and "7"). Consequently, two battery packs 1 having the reserved remaining battery charge are installed in the vehicle 20.

Meanwhile, the two battery packs 1 returned from the vehicle 20 are charged by the charger 31 at the battery station 30a. Since the charging speed of the charger 31 is 300 wh/h as mentioned above, two battery packs (IDs "2" and "4") whose estimated value of the remaining battery charge at the time of return is 600 wh are expected to be fully charged to 1600 wh at 12:10.

With the battery reservation device 10 in this embodiment, as shown in FIG. 5, at the time of reservation reception (8:00), the scheduled return time (8:50) of the two battery packs 1 scheduled to be returned and the remaining battery charge (600 wh) at the scheduled return time are calculated, and the result is added to the reservation information table as information indicating that these battery packs can be reserved.

Consequently, by adding reservation information before unreturned battery packs are actually returned to the battery station 30a, etc., reservation information can be presented to the next person reserving the rental of the battery packs 1 in a state of increased options.

As a result, a battery reservation apparatus 10 can be provided that affords more convenient usage than before and that allows flexible reservation acceptance processing to be performed.

Update Processing of Reservation Information Upon Acceptance of Reservation

Figure 6:
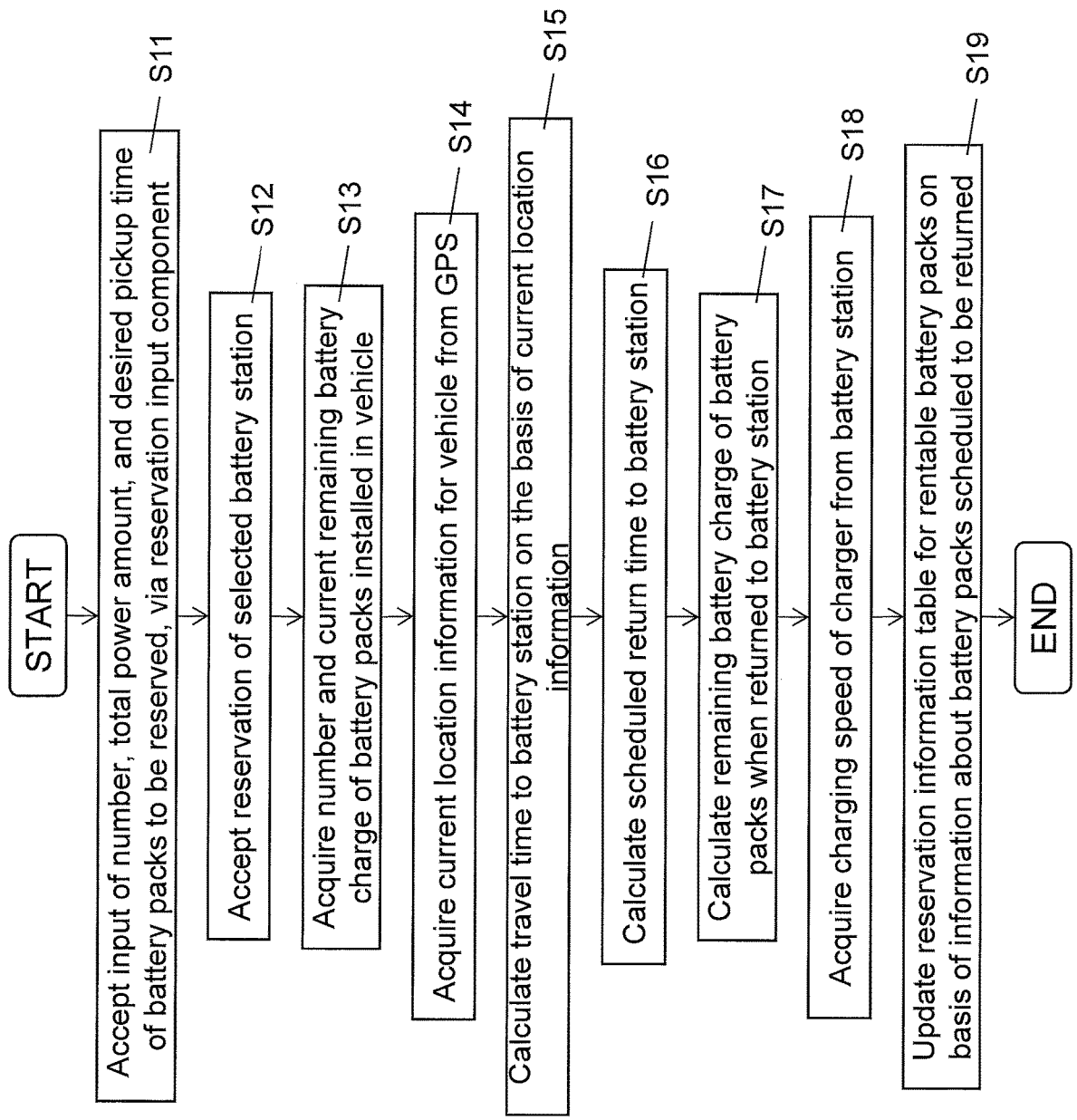
FIG. 6 is a flowchart of the flow of processing that causes information about the battery packs scheduled to be returned to be reflected in reservation information in a battery reservation method processed by the battery reservation device in FIG. 2.
Figure 7:
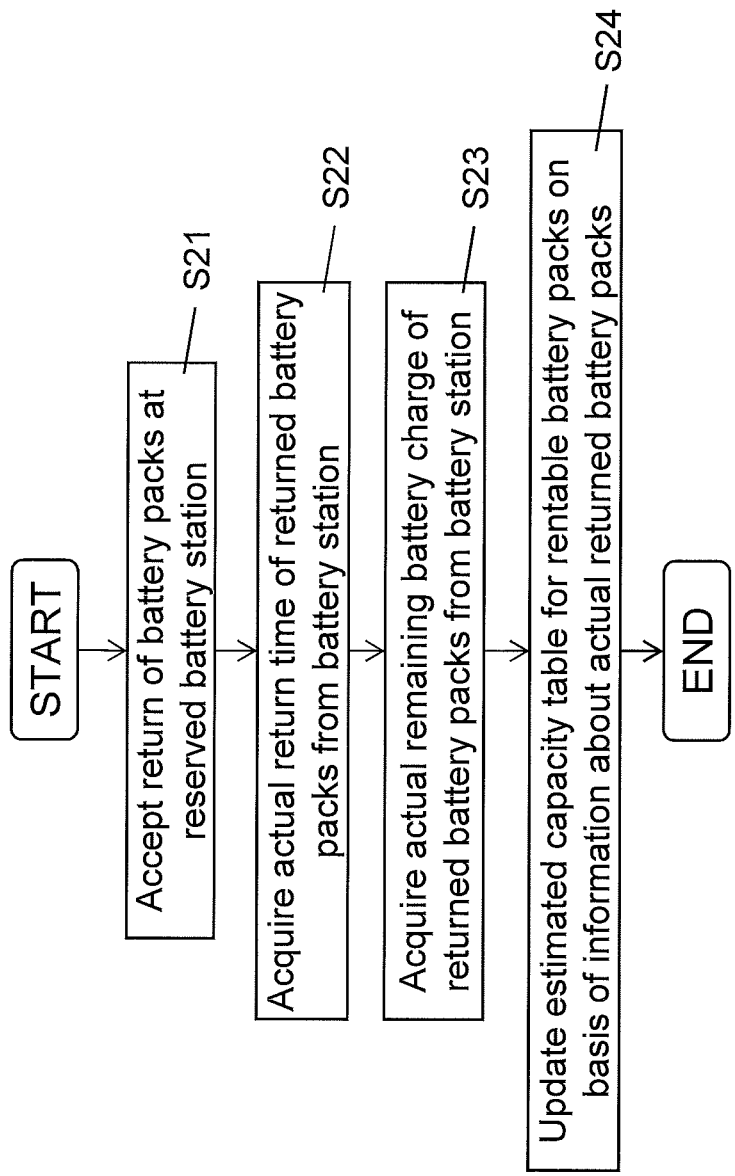
FIG. 7 is a flowchart of the flow in updating reservation information on the basis of the return time at which the battery packs were actually returned to the battery station and the remaining battery charge at the time of return in the battery reservation method in FIG. 6.

With the battery reservation device 10 in this embodiment, the reservation information table shown in FIG. 4 is updated so as to reflect the information about the battery packs 1 scheduled to be returned at the time of reservation acceptance, according to the flowchart shown in FIG. 6.

That is, the battery reservation device 10 in this embodiment acquires information such as the charging speed of the charger 31 and the remaining charge of the battery packs 1 that are scheduled to be returned and for which a reservation has been accepted, and performs processing to accept the next rental reservation and at a stage prior to their return.

More specifically, in step S11, the input acceptance component 11 accepts, via the reservation input component 23a of the vehicle 20, the number (2), the total power amount (3200 wh), and the desired pickup time (8:50 to 9:00) of battery packs 1 required by the person making the reservation.

Next, in step S12, reservation is accepted for the battery station 30a that holds the battery packs 1 having the remaining battery charge required for the desired pickup time selected by the person making the reservation.

Next, in step S13, the battery state acquisition component 12 acquires the remaining battery charge and the number of battery packs 1 installed in the vehicle 20 on the basis of the reservation information.

Next, in step S14, the location information acquisition component 13a acquires information related to the current location of the vehicle 20 from the GPS 24 installed in the vehicle 20.

Next, in step S15, the travel time calculator 13b calculates the travel distance and the travel time to the reserved battery station 30a on the basis of the current location information of the vehicle 20.

Next, in step S16, the scheduled return time acquisition component 13c calculates the scheduled time (scheduled return time of the battery packs 1) of arrival at the reserved battery station 30a by using the travel time calculated by the travel time calculator 13b.

Next, in step S17, the remaining battery charge prediction component 14 calculates the estimated value for the remaining battery charge at the time when the two battery packs 1 are returned to the reserved battery station 30a.

Next, in step S18, the battery station information acquisition component 15 acquires information related to the charging speed of the charger 31 installed at the reserved battery station 30a.

Here, the charge completion time calculator 16 may calculate the charge completion time for the two battery packs 1 scheduled to be returned.

Next, in step S19, the reservation acceptance component 17 adds the two battery packs 1 scheduled to be returned to the reservation information table as information indicating that rental is possible from the scheduled return time of 8:50.

Update Processing of Reservation Information Based on Information about Battery Packs 1 Actually Returned The battery reservation device 10 in this embodiment further acquires the time (actual return time) when the battery packs 1 are actually returned to the reserved battery station 30a, etc., from the battery station information acquisition component 15. The battery reservation device 10 then acquires the remaining charge of the actual battery packs 1 (actual remaining charge) at the point when the battery packs 1 are actually returned to the reserved battery station 30a, etc., from the battery station information acquisition component 15.

Consequently, even if there is a discrepancy between the estimated values for the scheduled return time calculated by the scheduled return time acquisition component 13c and the remaining battery charge at the time of return calculated by the remaining battery charge prediction component 14, and the actual return time and the actual remaining battery charge at the time of return, it is possible to update the reservation information to be accurate.

More specifically, in step S21, the battery station information acquisition component 15 receives from the reserved battery station 30a information indicating that the return of the two battery packs 1 installed in the vehicle 20 has been accepted.

Next, in step S22, the battery station information acquisition component 15 receives from the battery station 30a the time at which the two battery packs 1 that were scheduled to be returned were actually returned. The battery station information acquisition component 15 transmits this actual return time to the reservation acceptance component 17 as the actual return time.

Next, in step S23, the battery station information acquisition component 15 receives from the battery station 30a the actual remaining battery charge at the time of return for the two battery packs 1 scheduled to be returned. The battery station information acquisition component 15 transmits the actual remaining battery charge at the time of return to the reservation acceptance component 17 as the actual remaining battery charge.

Next, in step S24, the reservation acceptance component 17 acquires the actual return time and the actual remaining battery charge for the two battery packs 1 returned to the battery station 30a, and uses the actual numerical values to update the estimated values for the scheduled return time and the remaining battery charge at the time of return.

Here, it is conceivable that it will take longer than expected to arrive at the reserved battery station 30a due to heavy traffic, an accident, or the like.

With the battery reservation device 10 in this embodiment, even in such a case, the estimated values for the scheduled return time and the remaining battery charge at the time of return included in the reservation information table are updated with the actual return time and the actual remaining battery charge, and this improves the accuracy of the reservation information, including information about the battery packs 1 scheduled to be returned.

Other Embodiments

An embodiment of the present invention was described above, but the present invention is not limited to or by the above embodiment, and various modifications are possible without departing from the gist of the invention.

(A)

In the above embodiment, an example was given in which the configuration comprised the charge completion time calculator 16 that calculated the charge completion time at which a fully charged was reached after the return to the battery station 30a, etc., of the battery packs 1 scheduled to be returned to the reserved battery station 30a, etc. However, the present invention is not limited to this.

For instance, the charge completion time calculator is not necessarily required in the present invention, and a reservation for the rental of battery packs having a remaining battery charge satisfying the reservation conditions in a state before full charge may be accepted.

(B)

In the above embodiment, an example was given in which the location information acquisition component 13a acquired current location information from the GPS 24 installed in the vehicle 20, and the scheduled return time of the battery packs 1 was found by calculating the travel time to the battery station 30 on the basis of the distance from the current location of the vehicle 20 to the battery station 30 and the average speed of the vehicle 20. However, the present invention is not limited to this.

For instance, the scheduled return time may be set using the desired pickup time directly inputted by the person making the reservation via the reservation input screen.

In this case, it is unnecessary to acquire current location information about the vehicle 20, so the location information acquisition component 13a, the travel time calculator 13a, and the scheduled return time acquisition component 13c are omitted from the configuration, which gives a battery reservation device with a simpler configuration.

(C)

In the above embodiment, an example was given in which information related to the charging speed of the charger 31 was acquired from each battery station 30 in order to calculate the estimated value for the remaining battery charge of the battery packs 1 at the time of return to the reserved battery station 30a, etc. However, the present invention is not limited to this.

For instance, the battery reservation device may comprise a storage component for pre-storing information related to the charging speed of the charger installed in each battery station. Alternatively, information related to the charging speed by the charger may be acquired from an external server device or the like that stores information related to the charging speed of the charger installed in each battery station, via a communication line.

(D)

In the above embodiment, an example was given in which the actual return time of the battery packs 1 actually returned to the battery station 30a, etc., and the actual remaining battery charge at the time of return were acquired, and the reservation information table was updated. However, the present invention is not limited to this.

For instance, the battery reservation device may not have an actual return time acquisition component or an actual remaining battery charge acquisition component.

However, the above-mentioned components are preferably provided because they allow the time of actual return and the measured remaining battery charge to be reflected in the reservation information, which improves the accuracy of the reservation information.

(E)

In the above embodiment, an example was given in which the battery packs 1 in the vehicle 20 were mounted under the seat 20a. However, the present invention is not limited to this.

For instance, the battery packs may be disposed at some other position, such as somewhere under the handle bar 20b in the vehicle 20.

(F)

In the above embodiment, an example was given in which the battery reservation device 10 was installed in the battery stations 30a to 30c. However, the present invention is not limited to this.

For instance, the device may be installed at a location other than a battery station, such as a reservation management center that centrally manages the reservation status of battery packs, so long as communication is possible between the vehicle and the battery station.

(G)

In the above embodiment, an example was given in which the battery reservation device 10 was installed in each of the battery stations 30a to 30c. However, the present invention is not limited to this.

For instance, a battery reservation device may be installed in each vehicle.

In this case, each vehicle can present the best battery station to the user by acquiring necessary information such as the battery pack charging status at each battery station, via a communication component.

(H)

In the above embodiment, an example was given in which two battery packs 1 were installed in an electric motorcycle (vehicle 20) as a power consumption element. However, the present invention is not limited to this.

For instance, one battery pack or three or more battery packs may be installed in the power consumption element.

Also, the number of battery packs to be reserved for exchange is not limited to two, and it is possible to accommodate the needs of the person making the reservation, such as exchanging just one of two battery packs.

(I)

In the above embodiment, an example was given of battery packs 1 that supplied power to an electric motorcycle as a power consumption element (vehicle 20). However, the present invention is not limited to this.

For instance, the present invention may be applied not only to battery packs for supplying power to an electric motorcycle, but also to those used in other vehicles such as electric monocycles, electric bicycles, electrically assisted bicycles, electric automobiles (EVs), and PHVs (plug-in hybrid vehicles).

Alternatively, the electric power consumption element to which power is supplied from the battery pack of the present invention is not limited to a vehicle, and may instead be some other electrical product powered by a replaceable battery.

INDUSTRIAL APPLICABILITY

The battery reservation device of the present invention has the effect of allowing more flexible reservation acceptance processing to be performed by making it possible to accept reservations for battery packs that are scheduled to be returned, and is therefore widely applicable as a reservation device that accepts reservations for the rental of battery packs installed in various products.

REFERENCE SIGNS LIST 1 battery pack
10 battery reservation device
11 input acceptance component
12 battery state acquisition component
13a location information acquisition component
13b travel time calculator
13c scheduled return time acquisition component
14 remaining battery charge prediction component
15 battery station information acquisition component (charging speed acquisition component, actual return time acquisition component, actual remaining battery charge acquisition component)
16 charge completion time calculator
17 reservation acceptance component (reservation acceptance component, reservation information update component, reservation possibility determination component)
18 display controller
20 vehicle
20a seat
20b handle bar
21 front wheel
22 rear wheel
23 display section
23a reservation input component
24 GPS
30a to 30c battery stations
31 charger
S1 reservation input screen

The invention claimed is:

1. A battery reservation device that accepts reservations for battery packs that are rented out from a battery station and are installed in a power consumption element, the device comprising a processor configured with a program to perform operations comprising:
　operation as a battery state acquisition component configured to acquire a current remaining battery charge of battery packs scheduled to be returned to the battery station;
　operation as a scheduled return time acquisition component configured to acquire a scheduled return time at which the battery packs scheduled to be returned will be returned to the battery station;
　operation as a remaining battery charge prediction component configured to predict a remaining battery charge of the battery packs when the battery packs are returned to the battery station, based on the current remaining battery charge of the battery packs acquired by the battery state acquisition component and the scheduled return time of the battery packs acquired by the scheduled return time acquisition component;
　operation as a charging speed acquisition component configured to acquire a charging speed of a charger configured to charge the battery packs at the battery station; and
　operation as a reservation acceptance component configured to add the battery packs scheduled to be returned to a reservation information table and accept a rental reservation for the battery packs scheduled to be returned based on the remaining battery charge at a time of return predicted by the remaining battery charge prediction component and the charging speed of the charger acquired by the charging speed acquisition component.

2. The battery reservation device according to claim 1, wherein the processor is configured with the program to perform operations further comprising
　operation as a reservation possibility determination component configured to determine whether a battery pack scheduled for return can be rented out, based on the remaining battery charge at the time of return predicted by the remaining battery charge prediction component and the charging speed of the charger acquired by the charging speed acquisition component.

3. The battery reservation device according to claim 1, wherein the processor is configured with the program to perform operations further comprising
　operation as a charging completion time calculator configured to calculate a charging completion time for a battery pack scheduled to be returned, based on the remaining battery charge at the time of return predicted by the remaining battery charge prediction component and the charging speed of the charger acquired by the charging speed acquisition component.

4. The battery reservation device according to claim 1, wherein the processor is configured with the program to perform operations further comprising:
　operation as an actual return time acquisition component configured to acquire an actual return time at which a battery pack was returned to the battery station;
　operation as an actual remaining battery charge acquisition component configured to acquire an actual remaining battery charge of the battery pack returned to the battery station; and
　operation as a reservation information update component configured to update information related to scheduled battery pack rental based on the actual return time acquired by the actual return time acquisition component and the actual remaining battery charge acquired by the actual remaining battery charge acquisition component.

5. The battery reservation device according to claim 1, wherein the processor is configured with the program to perform operations such that operation as the battery state acquisition component comprises operation as the battery state acquisition component that further acquires one or more of the following: a unique ID of a battery pack, remaining capacity history information about the battery pack, voltage history, current history, and temperature history.

6. The battery reservation device according to claim 1, wherein the power consumption element comprises a vehicle, including an electric motorcycle, an electric bicycle, an electrically assisted bicycle, an electric automobile, or a PHV (plug-in hybrid vehicle).

7. The battery reservation device according to claim 6, wherein the processor is configured with the program to perform operations further comprising:
　operation as a location information acquisition component configured to acquire current location information for the vehicle; and
　operation as a travel time calculator configured to calculate a travel time from a current location to a reserved battery station based on the current location information for the vehicle acquired by the location information acquisition component.

8. The battery reservation device according to claim 7, wherein the processor is configured with the program to perform operations such that operation as the scheduled return time acquisition component comprises operation as the scheduled return time acquisition component that calculates the scheduled return time of a battery pack to the battery station based on the travel time calculated by the travel time calculator.

9. The battery reservation device according to claim 7, wherein the processor is configured with the program to perform operations such that operation as the remaining battery charge prediction component comprises operation as the remaining battery charge prediction component that calculates an amount of power required to reach the battery station based on the current location information for the vehicle acquired by the location information acquisition component and an average power consumption of the vehicle.

10. A battery reservation method in which reservations are accepted for battery packs that are installed in a power consumption element and are rented out at battery stations, the method comprising:

a battery state acquisition step of acquiring a current remaining battery charge of the battery packs scheduled to be returned to the battery station;

a scheduled return time acquisition step of acquiring a scheduled return time at which the battery packs scheduled to be returned will be returned to the battery station;

a remaining battery charge prediction step of predicting a remaining battery charge of the battery packs when the battery packs are returned to the battery station, based on the current remaining battery charge of the battery packs acquired by the battery state acquisition step and the scheduled return time of the battery packs acquired by the scheduled return time acquisition step;

a charging speed acquisition step of acquiring a charging speed of a charger configured to charge the battery packs at the battery station; and a reservation acceptance step of adding the battery packs scheduled to be returned to a reservation information table and accepting a rental reservation for the battery packs scheduled to be returned based on the remaining battery charge at a time of return predicted by the remaining battery charge prediction step and the charging speed of the charger acquired by the charging speed acquisition step.

* * * * *